M. WILEY.
LOCK NUT.
APPLICATION FILED APR. 13, 1918.

1,290,450.

Patented Jan. 7, 1919.

Witnesses
E. Q. Ruppert

Inventor
Mark Wiley
By Victor J. Evans
Attorney

UNITED STATES PATENT OFFICE.

MARK WILEY, OF CHICAGO, ILLINOIS.

LOCK-NUT.

1,290,450. Specification of Letters Patent. Patented Jan. 7, 1919.

Application filed April 13, 1918. Serial No. 228,422.

*To all whom it may concern:*

Be it known that I, MARK WILEY, a citizen of the United States, residing at Chicago, in the county of Cook and State of Illinois, have invented new and useful Improvements in Lock-Nuts, of which the following is a specification.

This invention relates to nut locks, particularly to that type in which the nut is locked upon the bolt, and has for its object the provision of a nut provided with locking means coöperating with interfitting locking means carried by a bolt engaging member and held in relative position with respect to the nut by a coupling.

An important object is the provision of a nut lock of this character which will be incapable of accidental derangement, highly efficient, positive in action, durable in service, and a general improvement of the art.

With these and other objects in view, the invention consists in the novel construction and arrangement of parts to be hereinafter more fully described and claimed, and illustrated in the accompanying drawing, in which:—

Figure 1:
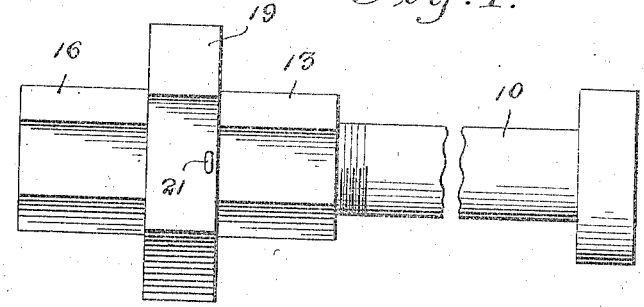
Figure 1 is a side elevation of a bolt having my improved nut lock thereon.
Figure 2:
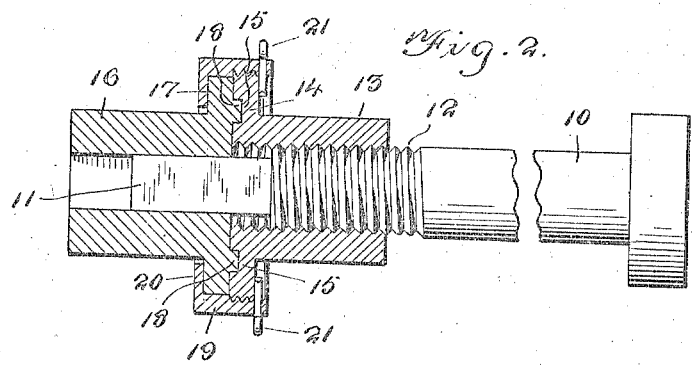
Fig. 2 is a longitudinal sectional view with the bolt shown in elevation.
Figure 3:
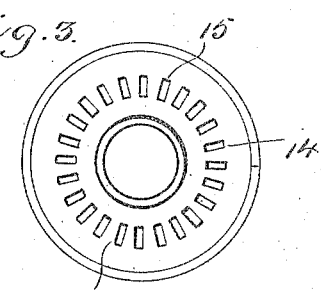
Fig. 3 is an end elevation of the nut detached.
Figure 4:
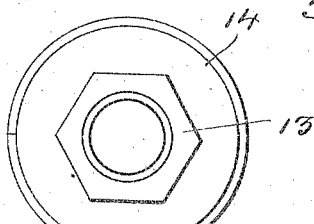
Fig. 4 is an elevation of the opposite end.
Figure 5:
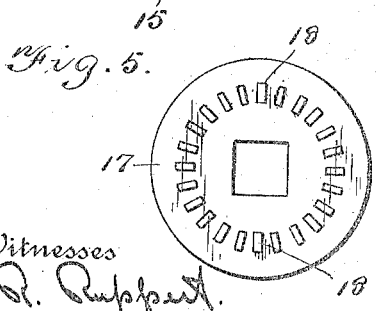
Fig. 5 is an end elevation of the coöperating face of the bolt engaging member.
Figure 6:
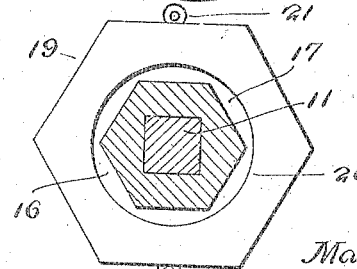
Fig. 6 is a cross sectional view through the bolt engaging member and the bolt.

Referring more particularly to the drawing, the numeral 10 designates a bolt having its end reduced and preferably squared, as shown at 11, though this reduced end may be hexagonal, triangular, or any other suitable angular configuration, if desired. The bolt is provided with a threaded portion 12 extending from the reduced extension or end 11 throughout any desired portion of its length. The nut member is designated by the numeral 13 and is angular in contour, being shown hexagonal in the present instance. The nut member 13 is provided with a threaded bore engageable upon the threaded portion 12 of the bolt. At its outer end the nut 13 is provided with an integrally formed enlarged portion 14 externally threaded, as shown. The upper face of this enlarged portion is provided with a plurality of grooves or recesses 15.

After the bolt is inserted through the elements to be bolted together, the nut 13 is screwed tightly upon the threaded portion 12. I further provide a bolt engaging member comprising a sleeve 16 having a bore conforming in size and shape to fit upon the reduced extension 11. An outwardly extending head 17 is formed integrally upon the sleeve 16 and has substantially the same diameter as the enlarged head 14 of the nut. The head 17 has formed thereon transverse ribs 18 seating within the grooves or recesses 15 in the head 14.

After the nut has been applied as previously described, the bolt engaging member 16 is placed in position, as shown, after which a union or coupling 19 internally threaded as shown, is threaded upon the externally threaded head 14. The coupling 19 has at its outer end an inwardly extending flange 20 bearing against the outer face of the head 7 for holding the bolt engaging member in position with the ribs 18 seating firmly within the grooves 15.

In order to provide means whereby the coupling 19 will be positively prevented from unscrewing from the head 14, I form the coupling 19 of sufficient length that when screwed into place it will project beyond the head 14 and I provide such projecting portion with alined holes for the passage of cotter pins 21, lengths of wire, or the like. It will be quite obvious that as long as the cotter pins are in position it will be impossible to unscrew the coupling 19.

From the foregoing description and a study of the drawing, it will be apparent that I have thus provided a nut lock whereby a nut after being screwed into position upon a bolt may positively and firmly be locked in relation to the bolt, whereby any accidental loosening will be positively prevented.

Having thus described my invention, what I claim is:

1. In combination, a bolt externally threaded and having a reduced squared end, a nut engaged upon the threaded portion of the bolt and having its outer face provided with grooves and its outer periphery threaded, a sleeve engaged upon the squared end of said bolt, ribs on said sleeve engaging within said grooves, and a coupling member threaded upon said nut and having a flange engaging said sleeve.

2. In combination, a bolt having an externally threaded portion and a reduced squared end, a nut engaged upon the threaded portion of said bolt, an enlarged head on said nut having its outer periphery threaded and its outer face provided with grooves, a sleeve engaged upon said squared extension, an enlarged head on said sleeve, ribs on said second named head engaged within the grooves within said first named head, and a coupling member threaded upon the outer periphery of said first named head and having an inwardly extending flange bearing against the outer face of said second named head.

3. In combination, a bolt having an externally threaded portion and a reduced squared end, a nut engageable upon the threaded portion of said bolt, a cylindrical enlarged head on said nut having its outer periphery threaded and its outer face provided with grooves, a sleeve engageable upon said squared end, a cylindrical head on said sleeve of substantially the same diameter as said first named head, ribs on said second named head engageable within said grooves, and a coupling member engageable upon the outer periphery of said first named head and having an inwardly extending flange engaging said second named head, the end of said coupling projecting beyond the inner face of said first named head and said projecting portion being provided with holes adapted for the reception of cotter pins.

MARK WILEY.

Copies of this patent may be obtained for five cents each, by addressing the "Commissioner of Patents, Washington, D. C."